(12) United States Patent
Allan et al.

(10) Patent No.: US 8,223,660 B2
(45) Date of Patent: Jul. 17, 2012

(54) FAILURE NOTIFICATION IN A NETWORK HAVING SERIALLY CONNECTED NODES

(75) Inventors: David Allan, Ottawa (CA); Malcolm Betts, Kanata (CA); Nigel Bragg, Weston Colville (GB); Peter Ashwood Smith, Gatineau (CA); Paul Unbehagen, Apex, NC (US)

(73) Assignee: Rockstar Bidco LP, New York, NY (US)

( * ) Notice: Subject to any disclaimer, the term of this patent is extended or adjusted under 35 U.S.C. 154(b) by 651 days.

(21) Appl. No.: 12/148,418

(22) Filed: Apr. 18, 2008

(65) Prior Publication Data

US 2008/0259784 A1   Oct. 23, 2008

Related U.S. Application Data

(60) Provisional application No. 60/912,455, filed on Apr. 18, 2007.

(51) Int. Cl.
*G01R 31/08* (2006.01)
*H04L 12/28* (2006.01)

(52) U.S. Cl. ........ 370/248; 370/230; 370/235; 370/252; 370/392

(58) Field of Classification Search .......... 370/229–231, 370/235, 248, 252, 312, 389, 392, 432; 709/220–222, 224–225, 238, 242
See application file for complete search history.

(56) References Cited

U.S. PATENT DOCUMENTS

| | | | | |
|---|---|---|---|---|
| 5,331,637 A | * | 7/1994 | Francis et al. | 370/408 |
| 5,825,772 A | * | 10/1998 | Dobbins et al. | 370/396 |
| 5,831,975 A | * | 11/1998 | Chen et al. | 370/256 |
| 5,917,820 A | * | 6/1999 | Rekhter | 370/392 |
| 6,466,985 B1 | * | 10/2002 | Goyal et al. | 709/238 |
| 6,578,086 B1 | * | 6/2003 | Regan et al. | 709/242 |

(Continued)

FOREIGN PATENT DOCUMENTS

EP    1 107 507    6/2001

(Continued)

OTHER PUBLICATIONS

International Search Report and Written Opinion form corresponding PCT application PCT/US2008/005004, Sep. 12, 2008, 10 pages.

(Continued)

*Primary Examiner* — Kwang B Yao
*Assistant Examiner* — Redentor Pasia
(74) *Attorney, Agent, or Firm* — Anderson Gorecki & Manaras, LLP

(57) ABSTRACT

Multicast capabilities of a link state protocol controlled network are used to accelerate the flooding advertisement of topology change notifications within portions of the network. This flooding mechanism may be particularly efficient in a network with a large number of two-connected nodes such as a ring network architecture. A control plane specific multicast group address is used when flooding topology change notifications, and a process such as reverse path forwarding check is used as an additional control on forwarding of the notification to prevent looping of control plane packets. Two-connected nodes insert a forwarding entry into their FIB to enable frames containing the control message to be forwarded via the data plane on to the downstream node so that propagation of the control message along a chain of two-connected nodes may occur at data plane speeds.

14 Claims, 5 Drawing Sheets

U.S. PATENT DOCUMENTS

| | | | |
|---|---|---|---|
| 6,606,325 B1 * | 8/2003 | Cain | 370/410 |
| 6,650,626 B1 * | 11/2003 | Cain | 370/256 |
| 6,904,018 B2 | 6/2005 | Lee et al. | |
| 6,917,983 B1 * | 7/2005 | Li | 709/238 |
| 6,928,050 B2 | 8/2005 | Lynch et al. | |
| 6,992,978 B1 | 1/2006 | Humblet et al. | |
| 7,436,860 B2 * | 10/2008 | Lee et al. | 370/539 |
| 7,546,380 B2 * | 6/2009 | Kouvelas et al. | 709/242 |
| 7,742,431 B2 * | 6/2010 | Ng et al. | 370/254 |
| 2002/0167898 A1 | 11/2002 | Thang et al. | |
| 2003/0090996 A1 | 5/2003 | Stewart | |
| 2003/0179742 A1 * | 9/2003 | Ogier et al. | 370/351 |
| 2007/0019646 A1 * | 1/2007 | Bryant et al. | 370/390 |
| 2007/0133530 A1 * | 6/2007 | Previdi et al. | 370/390 |
| 2007/0140107 A1 * | 6/2007 | Eckert et al. | 370/216 |
| 2008/0310340 A1 * | 12/2008 | Isozu | 370/328 |

FOREIGN PATENT DOCUMENTS

| | | |
|---|---|---|
| KR | 10-2005-0066468 A | 6/2005 |

OTHER PUBLICATIONS

Search Report from corresponding EP application 0874304.1.

* cited by examiner

---- (SA=B, DA=G)
—— (SA=F, DA=G)

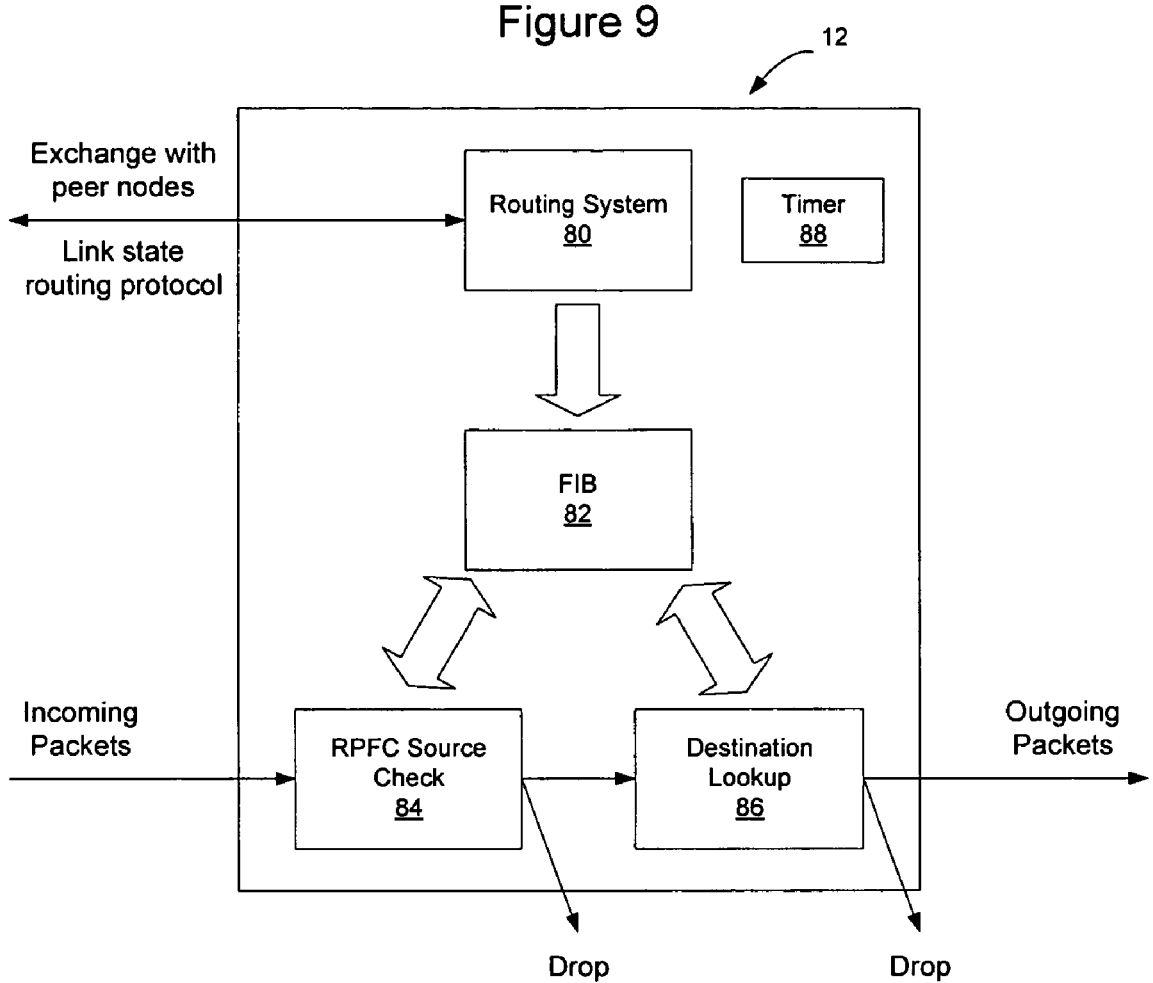

FAILURE NOTIFICATION IN A NETWORK HAVING SERIALLY CONNECTED NODES

CROSS-REFERENCE TO RELATED APPLICATIONS

This application claims priority to U.S. Provisional Patent Application No. 60/912,455, filed Apr. 18, 2007, entitled PLSB for Rings, the content of which is hereby incorporated herein by reference. This application also claims priority to the U.S. Provisional Patent Application that results from the conversion of U.S. Utility patent application Ser. No. 12/006, 256, filed Dec. 31, 2007, which was entitled FAILURE NOTIFICATION IN A NETWORK HAVING SERIALLY CONNECTED NODES, the content of which is hereby incorporated herein by reference. Applicants filed a petition to convert this Utility patent application to a provisional application on Apr. 15, 2008, and are thus claiming priority to the provisional application that results therefrom.

TECHNICAL FIELD

The present invention relates to link state protocol controlled Ethernet networks, and, more particularly, to a method and apparatus for enabling the rapid exchange of control information in a link state protocol controlled network.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

Ethernet is a well known networking protocol that has been defined by the Institute of Electrical and Electronics Engineers (IEEE) as standard 802.1 In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in application Ser. No. 11/537,775, filed Oct. 2, 2006, entitled "Provider Link State Bridging," the content of which is hereby incorporated herein by reference.

As described in greater detail in that application, rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their Forwarding Information Bases (FIBs) according to the computed view of the network. Two examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference. To prevent loops from forwarding, a reverse path forwarding check is performed to determine if a frame has been received on an expected port. If not, the frame is considered to be likely to have arrived as a result of unsynchronized/unconverged multicast forwarding and is dropped.

Link state protocols utilize the control plane to perform fault propagation. This is achieved by the flooding of advertisements of changes to the network state. This is normally performed exclusively as a control plane function and is hop by hop. Each node receiving a previously unseen notification re-floods it on all other interfaces, but a node receiving a notification of which it has prior knowledge simply discards the information as redundant. This will result in reliable synchronization of the routing databases in all the nodes in the network, but the overall amount of time to synchronize the routing databases across the network can become significant in proportion to desired recovery times. This is particularly true for sparsely connected topologies where there are chains of "two-connected nodes" with multi-homed edges. Ring topologies are a specific and commonly employed example.

An example ring topology is shown in FIG. 1. In FIG. 1, the ring 10 includes nodes A-E 12, which are interconnected by links 14. In the example shown in FIG. 1, each node has a data plane to handle transmission of data on the network (represented by the square block) and a control plane 12' (represented by the triangle block). The control plane is used to allow the network elements to exchange routing information and other control information, and is used by the network element to control how the data plane handles the data on the network.

When a failure occurs on the ring (indicated by the X in FIG. 1), the failure will be detected by the nodes adjacent the failure. The nodes adjacent the failure (nodes A and E in FIG. 1) will each generate a notification which will propagate in both directions around the ring. After the failure notification has propagated around the ring, the nodes will go through a hold-off period, and then begin calculating new paths through the network based on the new network topology. Once this has occurred the network will converge based on the new network topology and traffic will then start to follow the new paths through the network.

Route advertisements such as failure notifications are processed by the control plane 12' at each hop around the ring before being forwarded to other nodes in the network, which slows down propagation of the failure notification, impacting the overall network convergence times. Specifically, since each node is required to process the failure notification at the control plane before forwarding the failure notification to the next node, in order to determine whether the notification is new or a duplicate to be discarded, the rate of propagation of the failure notification is dependent on the speed with which the nodes are able to process the failure notification in the control plane. For example, as shown in FIG. 1, when a link fails, the adjacent nodes (nodes A and E in FIG. 1) will detect the failure. Node A will transmit failure notification 1 to node B which will forward the failure notification to node B's control plane 12'. After processing the failure notification, node B will forward the failure notification to node C, which will process the failure notification at its control plane and then forward the failure notification to node D. This process repeats at each node on the ring until the failure notice reaches Node E. In the opposite direction, node E will generate a failure notification 2 and transmit it to node D. Node D will process the failure at its control plane and forward it to C. This process repeats itself as message 2 works its way around the ring. The two failure notifications 1, 2 will thus counter-propagate around the ring to allow all nodes on the ring to be notified of the failure and properly scope the failure to being that of the link.

At each hop, the network element will process the message in its control plane before forwarding the failure notification on along the ring. Since the network cannot converge until the nodes have all received the notification, the amount of time it takes to propagate fault notification messages may be a significant contributor to the overall recovery time of the network. Thus, it would be advantageous to provide a method and apparatus for enabling the rapid exchange of control information in a link state protocol controlled network.

SUMMARY OF THE INVENTION

Data plane flooding of topology change notifications may be implemented in a link state protocol controlled Ethernet network to enable the data plane to rapidly disseminate notifications to a significant portion of the network without requiring the failure notification to be sequentially processed at every intervening node's control plane prior to further propagation. This allows the rate of propagation of the topology change notification to occur at data plane speeds rather than at control plane speeds.

While this is a significant optimization of control plane performance, in a link state controlled network which does not implement explicit synchronization mechanisms in addition to the documented loop mitigation mechanisms, there is a small probability of introducing a forwarding loop in the control plane multicast tree which may be detrimental to the network's ability to recover from multiple simultaneous topology changes.

In one embodiment of the invention, all nodes in the network are members of a common I-SID used exclusively for control plane notifications. In PLSB, this causes a multicast tree rooted on each member node of the I-SID to be created. Any node that originates a topology change advertisement uses its multicast tree for the control plane I-SID to advertise the topology change to all other current members of that specific (S,G) tree in addition to normal flooding (which exists as a simple backup mechanism). Nodes that receive the multicast notification subsequently use existing filter and re-flood mechanisms to add both reliability and comprehensive coverage to the overall mechanism. Nodes which receive the multicast notification never use dataplane multicast for onward propagation of the notification. A process such as reverse path forwarding check is used to squelch forwarding of the multicast notification to prevent looping of control plane packets. As noted above, this does not absolutely guarantee that loops will never form, but does greatly restrict the circumstances under which this can occur.

In another embodiment of the invention, PLSB multicast capabilities are used to accelerate the flooding advertisement of topology change notifications within portions of the network. This flooding mechanism may be particularly efficient in a network with a large number of two-connected nodes such as a ring network architecture. A control plane specific multicast group address is used when flooding topology change notifications, and a process such as reverse path forwarding check is used as an additional control on forwarding of the notification to prevent looping of control plane packets (something that a ring topology could facilitate in isolation). For simplicity, the control plane multicast group address can be a single, well known (*,G) address, used by all members of the control plane multicast group, and control of propagation is achieved by rules governing when it is used. It is possible to use a common (*,G) address for multicast propagation on both directions as the layer 2 multicast by definition is a directed tree of only one branch; a chain of one or more two connected nodes or a link between multiply connected nodes.

The multicast connectivity associated with the group is constructed such that any two-connected node ("two-connected" in terms of PLSB NNI connections) will relay the control plane notification at layer 2 as well as taking a copy of the notification for control plane handling. Any node more densely connected terminates the layer 2 multicast connectivity, passing a notification received on the multicast group address only to its Control Plane. Once the Control Plane has processed the notification and determined that it is previously unseen, a densely connected node may use the multicast mechanism to further propagate the notification on all ports which are members of the multicast group except the port on which the notification was received initially.

When a node detects a topology change, it will generate a notification and address the topology change notification to the common control plane multicast group address that is being used to forward notifications on the network. Each two-connected node will have an entry in its forwarding information base to forward frames with the common control plane multicast group address to the next node, as well as to forward a copy of the frame to the control plane for processing. Since forwarding of the frames may occur in the data plane, the rate of propagation of the failure notification may be accelerated relative to the propagation of a similar failure notification that relied on the control plane to make forwarding decisions for the failure notification.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 9 is a schematic representation of a possible implementation of a network element configured to be used in a link state protocol controlled Ethernet network according to an embodiment of the invention.

DETAILED DESCRIPTION

Nodes on a link state protocol controlled Ethernet network exchange link state advertisements to enable each node on the network to have a synchronized view of the network topology. The nodes use the topology to compute shortest paths through the network to all other nodes on the network. The shortest paths may then be used to insert forwarding state into a forwarding information base that will allow the nodes on the network to forward frames to the intended destination.

Figure 1:
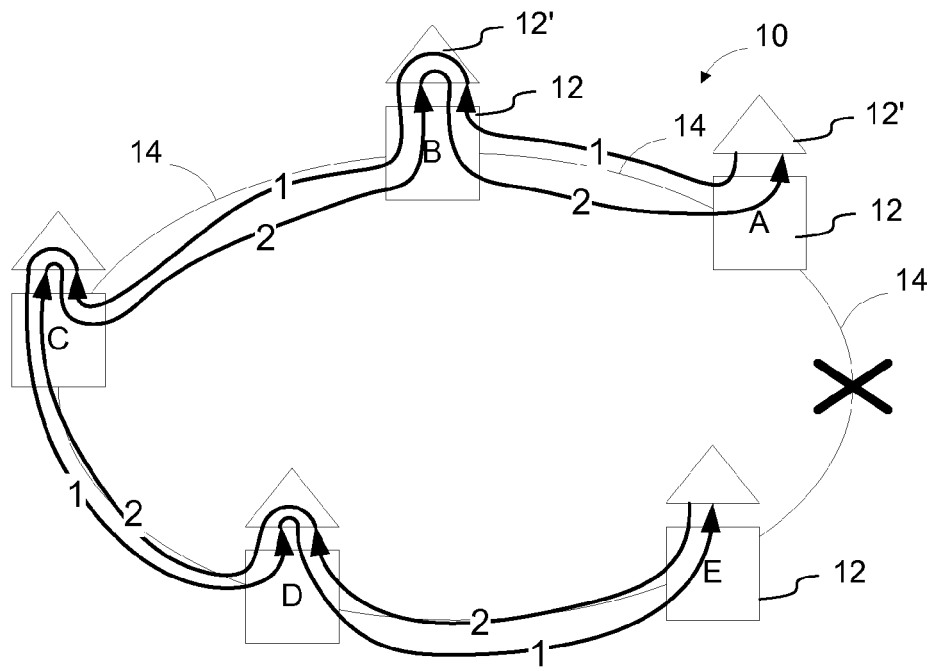
FIG. 1 is a functional block diagram of a ring network topology illustrating the conventional flow of failure notifications.
Figure 2:
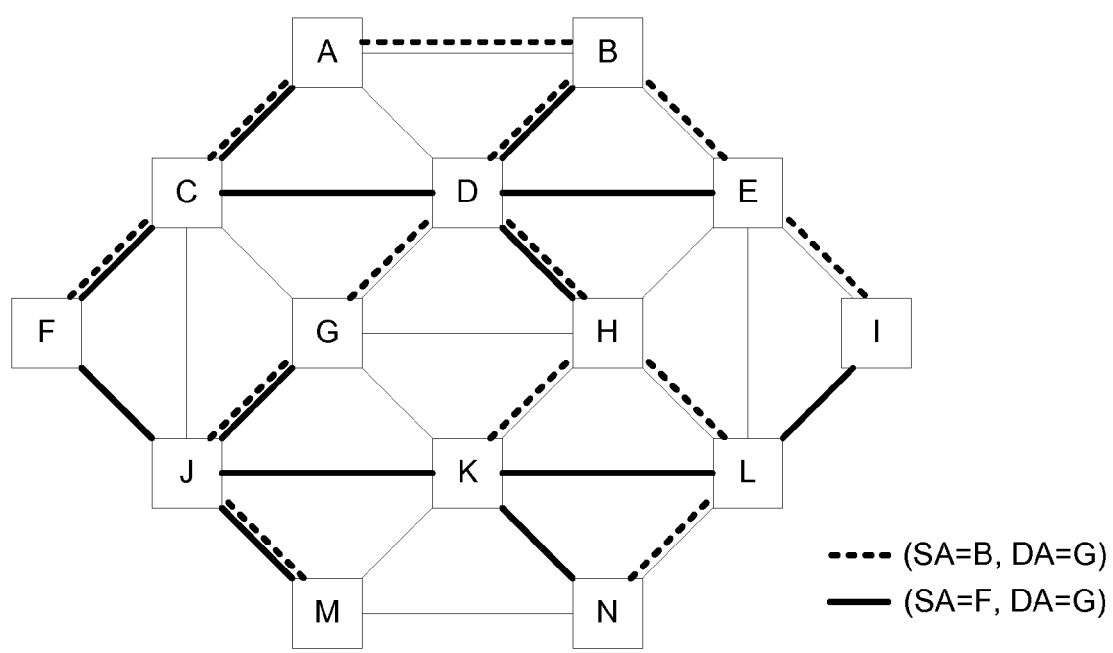
FIG. 2 is a functional block diagram of an example network having a mesh topology in which multiple multicast trees are rooted on each node for use in dissemination of control information on the network according to an embodiment of the invention.

In one embodiment of the invention, all nodes in the network hosting a control plane are members of a common I-SID used exclusively for control plane notifications. In PLSB, this causes a multicast tree rooted on each member node of the I-SID to be created. FIG. 2 shows an example network having a mesh topology in which multiple multicast trees are rooted on each node for use in dissemination of control information on the network according to an embodiment of the invention. As shown in FIG. 2, nodes on a mesh network are generally connected to a plurality of other nodes, so that there are multiple ways in which traffic may be forwarded through the network. According to an embodiment of the invention, each node 12 on the mesh network is a member of a control plane I-SID and will advertise membership in the I-SID. That will cause the nodes on the network to install shortest path forwarding state for the multicast group control address for a multicast tree associated with the I-SID rooted at each node. For example, as shown in FIG. 2, a first multicast tree will be established interconnecting node F with each of the other nodes on the network. Similarly, a second multicast tree will be established from node B to all of the other nodes on the network.

Any node that originates a topology change advertisement uses its multicast tree for the control plane I-SID to advertise the topology change to all other current members of that specific (S,G) tree in addition to normal flooding (which exists as a simple backup mechanism). Nodes that receive the multicast notification subsequently use existing filter and re-flood mechanisms to add both reliability and comprehensive coverage to the overall mechanism. Nodes which receive the multicast notification never use dataplane multicast for onward propagation of the notification. A process such as reverse path forwarding check is used to squelch forwarding of the multicast notification to prevent looping of control plane packets. As noted above, this does not absolutely guarantee that loops will never form, but does greatly restrict the circumstances under which this can occur.

According to another embodiment of the invention, the use of layer two multicast forwarding for control plane traffic may be confined to individual links or chains of two connected nodes, the nodes on a ring-shaped topology being an illustrative exemplar. The network may be configured to use this mechanism to disseminate topology change notifications and optionally other control messages. A well known control plane multicast address (G) may be assigned to be used for addressing topology change notifications on the network. Each node on the network will:

1) Originate topology change notifications using the control plane multicast address.
2) Receive topology change notifications directed to the control plane multicast address and perform a reverse path forwarding check on them, discarding immediately any notifications received on a port which is not on the shortest path to the SA MAC of the notification packet.
3) Accept topology change notifications directed to the control plane multicast address and copy them to the node's control plane so that the node may use the information in the failure notification to update its link state database.
4) When the node is two connected (has only two NNI adjacencies), it will have configured its FIB such that it will relay packets addressed to the control plane multicast address received on one NNI port to the other NNI port, and vice versa.

When a network node detects a topology change, it may generate a notification and format an Ethernet frame to communicate the notification with a MAC header that uses its MAC address as the source MAC address (SA) and the control plane multicast group address (G) as the destination address (DA). It will forward the notification on all interfaces on which it has control adjacencies.

Figure 3:
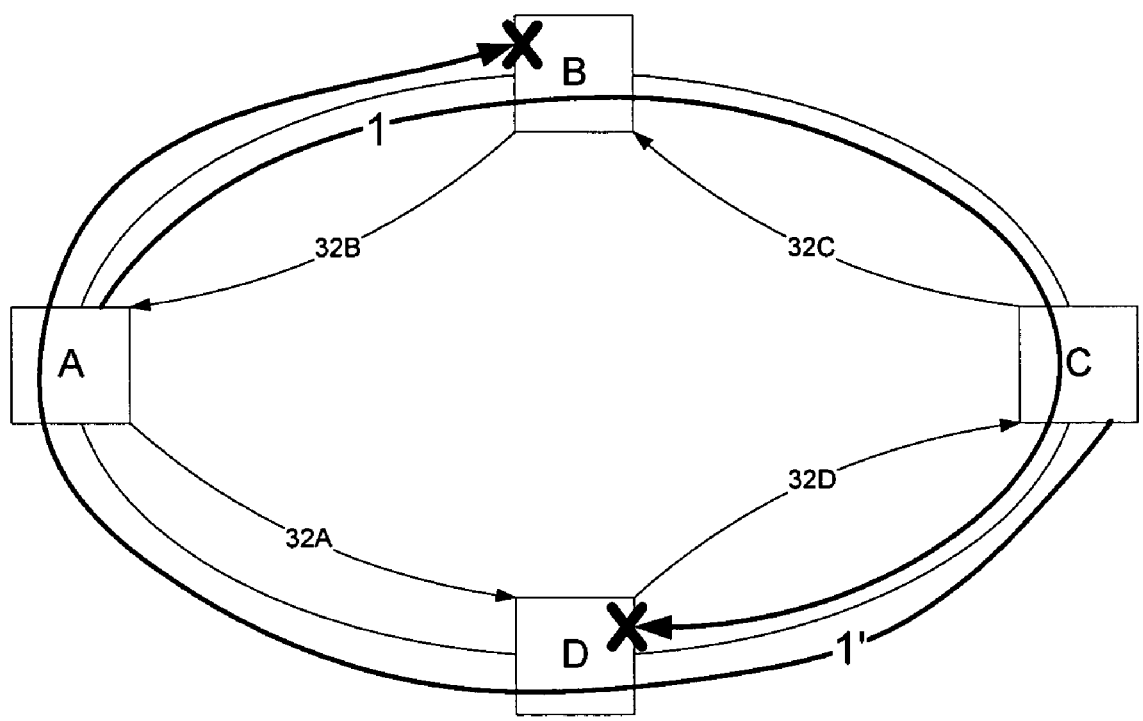
FIG. 3 is a functional block diagram of a ring network topology illustrating the flow of control messages such as failure notifications according to an embodiment of the invention.

FIG. 3 is a functional block diagram illustrating the flow of control messages such as failure notifications on a ring topology network according to an embodiment of the invention. For simplicity, the ring in the example of FIG. 3 is shown as being complete and not currently experiencing failure. The manner in which a failure is handled will be discussed in greater detail below in connection with FIGS. 7 and 8.

As shown in FIG. 3, assume that at time T0, node A generates a control message and addresses it to the control plane multicast group address (G) that will used to forward control messages on the network. The message 1 will thus have a header with [SA=A, DA=G]. Node A will forward the message to B, which will forward it around the ring to node C, which in turn will forward the message to node D. Node D will see that the message is addressed to control plane multicast group address G, which is a valid multicast address, but will also notice that the message has arrived from a port connected to node C rather than on a port connected to node A. Since the source address of the message indicates that the message originated at node A, the RPFC process in the data plane of node D will terminate propagation of the message and cause the message to be dropped.

It is possible to identify multiple embodiments of reliability mechanisms designed to make the mechanism robust. One would be that the originating node used both multicast and control plane flooding, and each node receiving a previously un-received notification re-flooded it. Although such a technique would stabilize, it would produce a large number of duplicate notifications. This could be improved upon if multicast notification was only used when it was authoritatively known that the downstream node was 2 connected, however this is less desirable A preferred embodiment would be one that minimized the number of duplicate notifications, was authoritatively robust, and used a common notification origination mechanism regardless of the downstream topology, meaning that a node should not need to know if the neighbor is 2-connected or not, or care how or from whom the notification was received.

In one embodiment:
1) the control plane multicast address is used on all control adjacencies
2) An originator of a multicast notification operates a retry timer on each interface upon which it sent a multicast notification. It will resend the notification on any interface on which no acknowledgement was received upon expiration of the timer. Note that an originator may be >2 connected, but may have some number of 2 connected peers.
3) Any receiver of a multicast notification acknowledges receipt to its immediate peer from which the multicast notification was received
4) A two connected receiver of a multicast notification relays it onto the interface on which it did not receive the notification, and does not immediately re-flood it as a Control Plane action.
5) A two connected receiver of a multicast notification will start a retry timer on the interface on which it did not receive a multicast notification. It behaves like it was the originator.
6) Any >2-connected node receiving a multicast notification that it has not received before will re-flood it by Control Plane action on all interfaces but the one it was received as per normal control plane flooding procedures.

Figure 4:
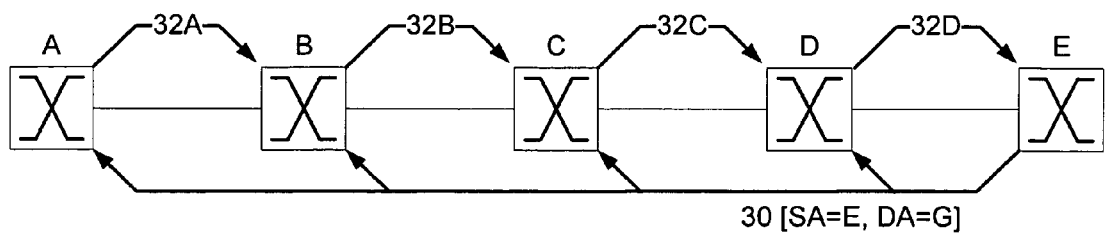
FIGS. 4-6 show the hop-by-hop propagation of control messages such as failure notifications in a chain of two-connected nodes according to an embodiment of the invention.
Figure 5:
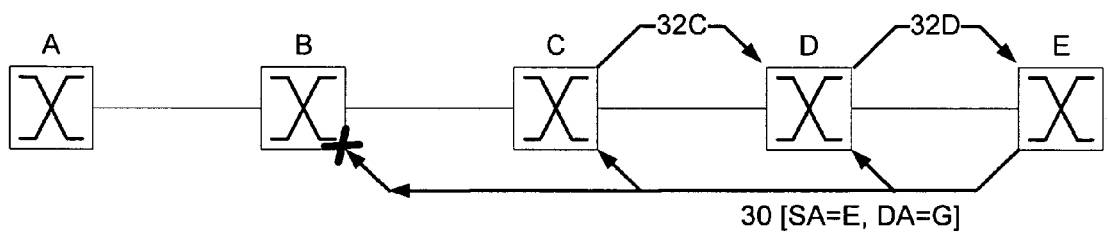
Figure 6:
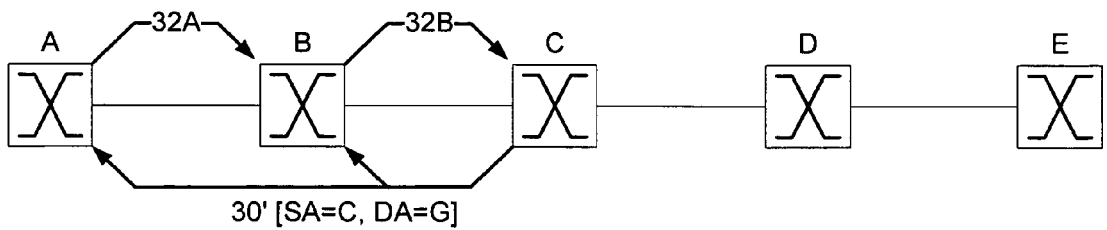

FIGS. 4-6 show the hop-by-hop propagation of control messages such as failure notifications in a network of two-connected nodes according to an embodiment of the invention. As shown in FIG. 4, when a node forwards a control message 30, it expects the next node on the network to acknowledge receipt of the message 32. Thus, at each hop, the node will expect the next subsequent node to send an acknowledgment of receipt of the message. The acknowledgement message is unicast and not forwarded by the node when received.

FIG. 5 illustrates a situation where a downstream node fails to acknowledge receipt of the control message 30. Specifically, assume that node E generates a control message 30 that is transmitted to node D, and from node D to node C. Each of nodes C and D will generate an acknowledgement message that is transmitted one hop back toward the source of the control message. Thus, node D will send an acknowledgement 32D to node E, and node C will send an acknowledgement message 32C to node D.

When node C forwards the control message 30 toward node B it will wait for an acknowledgment message from node B. Node C will wait for a period of time and, if an acknowledgment is not received from node B will determine that node B either didn't receive the message or that node B received the message, but that the RPFC process in node B caused the message to be squelched. This may happen, in the example shown in FIG. 3, where node D squelched the failure notification (message 1 in FIG. 3) because the source address of the message was node A and the message was received on a port connected to node D.

Referring back to FIGS. 5-6, assume that B squelches the message 30 because message 30 fails the RPFC at node B. Thus, node B will not generate an acknowledgment to node C. If node C does not receive an acknowledgement, node C will re-issue the control message 30' using its own source address as the source address. The control plane multicast group address G will be used as the destination address and all other information associated with the control message will be the same as the original message. When node B receives the message, the RPFC check on the message will determine that the reissued message has arrived on the correct port, and thus node B will forward the message to node A, generate an acknowledgment message 32B, and process the message. Similarly, node A will also receive the message, process the message, and transmit an acknowledgment 32A back to node B.

Referring back to FIG. 3, assume that control message 1 was forwarded from node A to node B, from node B to node C, and from node C to node D. Node B will send an acknowledgment to node A, and similarly node C will send an acknowledgment to node B in accordance with the processes described above in connection with FIGS. 4 and 5. Node D would squelch the control message, however, for failing its RPFC. Thus, node D will not send an acknowledgement message to node C.

After a period of time, node C will time out and determine that it is not going to receive an acknowledgement message from node D. Thus, node C will re-issue the control message (message 1') using its own MAC address as the source MAC address, but otherwise containing all the same information as the original message. Message 1' will be transmitted to node D, which will forward the message to node A and acknowledge receipt to node C.

Node A will forward the message to node B, and acknowledge receipt to node D. When node B receives the message from node A, node B will perform RPFC and determine that the message has been received at an incorrect port and that it should not forward the message. Thus, node B will squelch the control message (message 1') from node A. Node B will not acknowledge receipt of the message. Thus, under normal circumstances node A would wait to time-out and re-issue the message. However, in this instance, node A will recognize that the message (message 1') is a duplicate of an earlier message (message 1) and not re-issue the message. Accordingly, nodes will only reissue a message upon expiration of a timeout timer where the message to be reissued is not redundant of an earlier message that was previously forwarded or generated by the node.

As shown in FIG. 3, forwarding of messages may be implemented on the data plane to flood control messages to all nodes on a ring network. RPFC may be used to squelch transmission of messages back to the original source of the message so that a loop is not formed. Requiring the nodes to acknowledge receipt of the message allows nodes to determine when a message has been squelched, to allow the message to be regenerated with a new source MAC address that should pass through the RPFC check on the node that squelched the message. However, to prevent the regeneration process from forming a loop, a node will only regenerate a message where the message to be regenerated is not a duplicate of an earlier forwarded control message.

Figure 7:
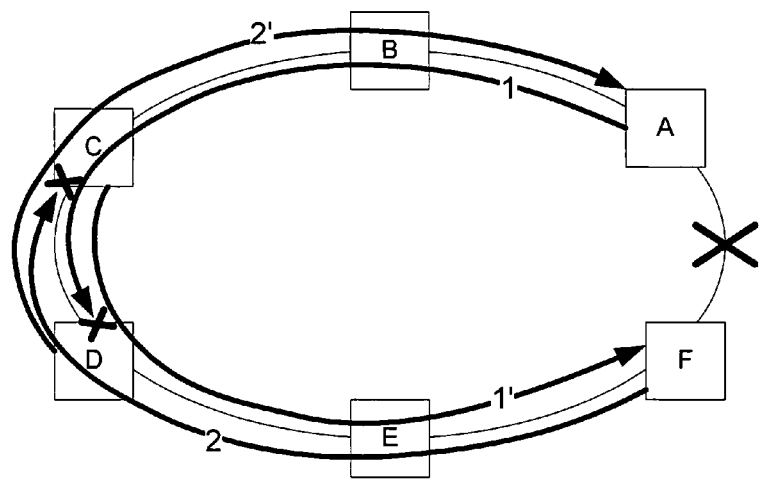
FIG. 7 shows application of the control message propagation process illustrated in connection with FIGS. 4-6 to a ring network topology experiencing a failure according to an embodiment of the invention.

FIG. 7 shows application of the control message propagation process illustrated in connection with FIGS. 3-6 to a ring network topology experiencing a failure according to an embodiment of the invention. In the example network shown in FIG. 7, it will be assumed that there has been a failure on the ring between nodes A and F. Upon detecting the failure, node A will generate a failure notification message (message 1) having MAC addresses [SA=A, DA=G]. Similarly, node F will detect the failure and generate a failure notification message (message 2) having a MAC address [SA=F, DA=G]. In both messages, MAC address G is the control plane multicast group address to be used for exchanging failure notifications and optionally other control messages on the link state protocol controlled Ethernet network.

Message 1 will be received, forwarded, and acknowledged by node B, and then received, forwarded and acknowledged by node C. The nodes will process the message as described above in connection with FIGS. 3-7. Node D, when it receives the message, will perform RPFC and determine that messages from node A should arrive via the other direction around the ring. Thus, the original failure notification message (message 1) from node A will fail the RPFC check at node D and be dropped. Since the message is dropped in the data plane, the message will not be forwarded and will not be passed to the control plane of the node. Thus, the node will not generate an acknowledgement message to node C and will not use the content of the message to update its link state database.

Node C will wait a period of time for an acknowledgment from node D and, when it times out, will reissue the failure notification as message 1', having a MAC address [SA=C, DA=G] where G is the control plane multicast group address. Node C will forward the reissued failure notification message 1' to node D which will forward the message and acknowledge message 1' to node C. The failure notification message 1' will similarly be received, forwarded, and acknowledged by nodes E and F. Thus, the failure notification for node A will be forwarded all the way around the ring.

In the reverse direction, failure notification message 2 will be forwarded by nodes E and D and squelched by node C. Upon expiration of the timeout period, node D will reissue failure notification message (message 2') which will be forwarded by nodes C and B to reach node A. In this manner, the multicast forwarding state for the control plane multicast group address G that is stored in the forwarding information bases by the nodes on the ring may be used to forward failure notifications in both directions around the ring. RPFC may be used to squelch forwarding of the frames while the acknowledgement process may be used to re-issue squelched frames to ensure that every node receives a copy of the control message.

Since all of the processes required to be implemented in connection with forwarding the control message are implemented in the data plane, the control message may be forwarded at data plane speeds through the network rather than waiting at each hop while the message is processed in the control plane. Thus, using the techniques set forth herein, the amount of time it takes to propagate a failure notification may be reduced significantly, compared to an implementation which relies on the control planes of the nodes to make the forwarding decisions. Additionally, since forwarding of the control messages only requires a single entry in the FIB for each node (*,G) where * is a wildcard indicating any source address, the solution is scalable and does not expand unduly as the size of the network increases.

Although FIG. 7 provided an example where the control message being flooded was a failure notification, the invention is not limited in this manner. Rather, other control messages such as link state advertisements (LSAs) and other control messages commonly required to be exchanged by the routing protocol implemented on the network may be forwarded using the flooding mechanism described herein. For example in the example shown in FIG. 3, the original message 1 may be a link state advertisement or other control message. Where the mechanism described herein is used as a general control message flooding mechanism, the control messages may be maintained within an administrative domain by causing Area Boundary Bridges (ABB) to terminate messages addressed to the control plane multicast group address, while acknowledging receipt to the previous node to prevent duplicate messages from being transmitted to the ABB.

Figure 8:
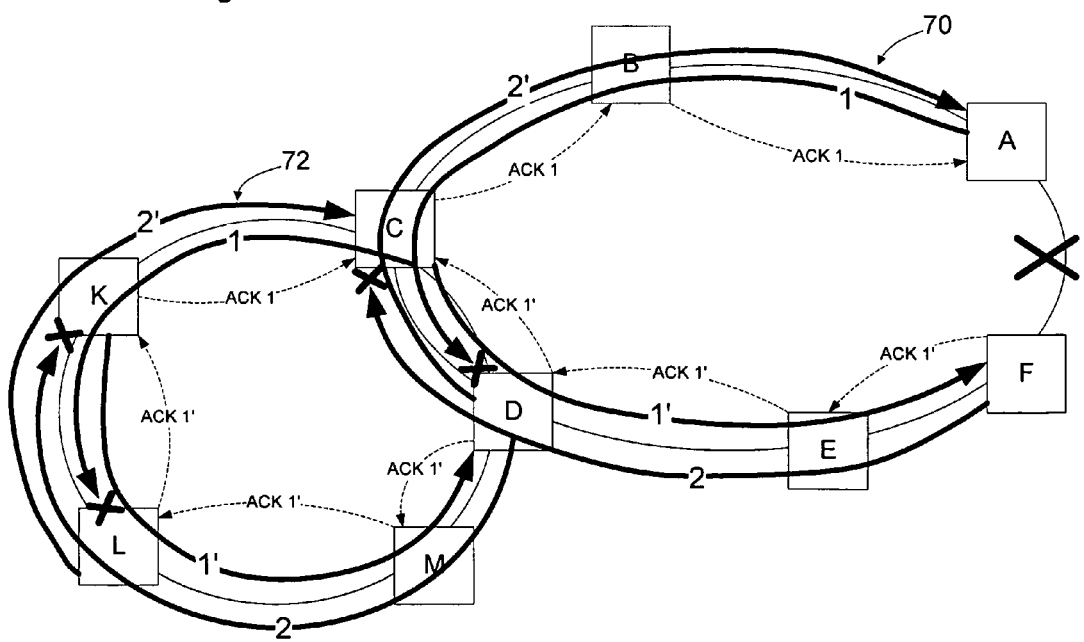
FIG. 8 shows application of the control message propagation process illustrated in connection with FIGS. 4-6 to a ring network topology connected with a second ring network topology according to an embodiment of the invention.

Ring networks are frequently interconnected. FIG. 8 shows application of the control message propagation process illustrated in connection with FIGS. 4-6 to a ring network topology connected with a second ring network topology according to an embodiment of the invention. In the example shown in FIG. 8 it will be assumed that there has been a failure between nodes A and F on a first ring 70 formed from nodes A-B-C-D-E-F-A. Additionally, in the example shown in FIG. 8 the network also includes a second ring 72, formed from nodes C-G-H-I-D-C, that is connected to the first ring at nodes C and D.

Nodes C and D are more than 2-connected, and so do not relay multicast messages in the dataplane. The arriving control multicast notification message is sent only to their respective control planes. After processing to determine that the notification is previously unseen, the control planes cause the notification to be multicast (using the control multicast group address) to both rings, but excluding the port on which the initial notification was received. Thus, when node C receives a new control message from node B, node C will forward it after processing to nodes D and G. Similarly, when node C receives a new control message from node D, node C will forward the control message after processing to nodes B and G. The other bridging node, Node D will forward control messages to nodes C, E, and I after processing.

When node A detects a failure on the link to node F, it will generate a failure notification (message 1) and transmit it to node B. Node B will forward the message to node C, acknowledge the message to node A, and update its link state database. Node C will forward the message to nodes D and G, acknowledge the message to node B, and process the message to update its link state database. Node G will acknowledge receipt of the message, because the message will pass the RPFC check at node G. Node D, however, will not acknowledge receipt of the message 1 because it is assumed in this example that message 1 would not pass RPFC at node D. Accordingly, Node C will reissue message 1 as message 1' which will then propagate around the other side of ring 70 to arrive at node F.

On ring 72, message 1 will be squelched at node H, causing node G to reissue message 1 as message 1' on ring 72. When message 1' reaches node D, node D will squelch message 1' because it will not pass RPFC at node D.

Node F will similarly generate a failure notification message 2, which will pass around the rings 70, 72 in the opposite direction from message 1.

In another embodiment, in which dataplane multicast is used for rapid relay of control plane notifications through two-connected nodes:

1) the control plane multicast address is used on all control adjacencies;

2) An originator of a multicast notification operates a retry timer on each interface upon which it sent a multicast notification. Upon expiration of the timer, the originator of the multicast notification will re-flood it by Control Plane action on each interface upon which it sent a multicast notification as per the normal control plane flooding procedures using unicast messaging.
3) A two connected receiver of a multicast notification relays it onto the interface on which it did not receive the notification, and does not immediately re-flood it as a Control Plane action. It will also start a retry timer on the interface on which it did not receive a multicast notification. It behaves like it was the originator as described at step 2) above.
4) Any >2-connected node receiving a multicast notification that it has not received before will reflood it by Control Plane action on all interfaces but the one it was received as per normal control plane flooding procedures.

FIG. 9 is a schematic representation of a possible implementation of a network element 12 configured to be used in a link state protocol controlled Ethernet network. The network element 12 includes a routing system module 80 configured to exchange control messages containing routing and other information with peer bridges 12 in the network 10 regarding the network topology using a link state routing protocol such as OSPF or IS-IS. Information received by the routing system 80 may be stored in a link state data base 90 or in another manner. As discussed previously, the exchange of information allows bridges on the network to generate a synchronized view of the network topology, which then allows the routing system module 80 to calculate the shortest paths to other nodes on the network. The shortest paths calculated by the routing system 80 will be programmed into a FIB 82, that is populated with the appropriate entries for directing traffic through the network based upon the calculated shortest paths, multicast trees, traffic engineered path entries, and based on other entries.

According to an embodiment of the invention, the routing system 80 may exchange route updates associated with the control plane multicast group address (G) to allow the routing system to install forwarding state for the control plane multicast group address in the FIB 82. The forwarding state in the FIB allows the network element 12 to forward control messages such as failure notifications using the process described in greater detail above. The routing system may also handle the acknowledgments described herein to allow the network element 12 to respond to receipt of control messages addressed to the control plane multicast group address, and to allow the network element to re-issue control messages if an acknowledgment is not received before expiration of timer 88.

The network element 12 may also include one or more other modules such as a Reverse Path Forwarding Correction (RPFC) source check module 84 that may be used to process incoming frames and perform a lookup in the FIB 82 to determine if the port over which the frame was received coincides with the port identified in the FIB 82 for the particular Source MAC. Where the input port does not coincide with the correct port identified in the FIB, the RPFC source check module may cause the message to be dropped. Where a packet addressed to the control plane multicast group address fails RPFC, the packet will be dropped and not forwarded to the control plane, so that the control message will not be acknowledged by the network element 12.

If the frame passes the RPFC source check 84 module, a destination lookup 86 module determines from the FIB 82 the port or ports over which the frame should be forwarded. If the FIB doesn't have an entry for the VID, the frame is discarded. If the message is addressed to the control plane multicast group address, the forwarding state in the FIB will direct the frame to the correct output port, as well as to the control plane. The control plane will then acknowledge receipt by generating a unicast message addressed to the upstream node on the link connected to the port on which the message was received. If the node is two-connected, the FIB will contain a dataplane entry to forward the control message out a port containing the NNI to the downstream node as well as to relay the control message to the control plane. If, however, the node is more than two-connected, the FIB will contain a reference to relay the control message to the control plane rather than forward the message. Once the control plane has processed the message, the control plane may then forward the control message onward along the multicast tree that has been established for dissemination of control messages on the network. In this way, the nodes on the network that are two-connected may quickly forward control frames to accelerate dissemination of control information on the network, while allowing nodes that are more than two-connected to use their control plane to control dissemination of control messages on the link state protocol controlled network.

It should also be understood that the modules described are for illustrative purposes only and may be implemented by combining or distributing functions among the modules of a bridge node as would be understood by a person of skill in the art.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:
1. A method of enabling rapid failure notification in a link state protocol controlled Ethernet network having dataplane multicast capability, the method comprising the steps of:
issuing, by a first node operating in the link state protocol controlled Ethernet network, a frame containing a control message signifying a local topology change, the frame being addressed to a control plane specific multicast group address;
receiving, by a second node operating in the link state protocol controlled Ethernet network, the frame containing the control message from the first node, the frame being addressed to the control plane specific multicast group address;

performing a reverse path forwarding check on the frame by the second node to determine if the frame arrived on an expected port at the second node for the first node;

discarding the frame immediately, by the second node, when the frame fails the reverse path forwarding check; and forwarding the frame, by the second node toward a plurality of downstream nodes in the link state protocol controlled Ethernet network, according to forwarding state stored in a forwarding information base on the second node only if the frame passes the reverse path forwarding check wherein a selection of the plurality of downstream nodes to which the frame is forwarded is determined by the steps of:

only forwarding the frame if the second node is two-connected between the first node and a third node, and only forwarding the frame by the second node to the third node from which the frame was not received; and processing the frame in a control plane prior to forwarding the frame if the second node is more than two-connected.

2. The method of claim 1, wherein the control message is a link state routing protocol control message.

3. The method of claim 1, where the control plane specific multicast group address is a source-specific multicast address.

4. The method of claim 1, where the selection of the plurality of downstream nodes to which the frame is forwarded is determined by a shortest path tree rooted on an originator of the message.

5. The method of claim 1, where the control plane specific multicast group address is a (*,G) multicast address common to all nodes and assigned to control message exchange.

6. The method of claim 1, further comprising the step of:
acknowledging the frame, by the second node to the first node, if the frame passes the reverse path forwarding check on the second node.

7. The method of claim 6, wherein the step of acknowledging the frame to the first node is only performed if the second node is two-connected between the first node and the third node, wherein a node is two-connected if it has two Network to Network Interface (NNI) adjacencies.

8. A method of enabling rapid failure notification in a link state protocol controlled network having dataplane multicast capability, the method comprising the steps of:

issuing, by a first node operating in the link state protocol controlled network, a frame containing a control message signifying a local topology change, the frame being addressed to a control plane specific multicast group address;

receiving, by a second node operating in the link state protocol controlled network, the frame containing the control message from the first node, the frame being addressed to the control plane specific multicast group address;

forwarding the frame, by the second node toward a plurality of downstream nodes in the link state protocol controlled network, according to forwarding state stored in a forwarding information base on the second node;

waiting for an acknowledgement of the frame from at least one of the plurality of downstream nodes;

inferring that the frame did not pass a reverse path forwarding check at a particular downstream node if the acknowledgment is not received from the particular downstream node; and reissuing the frame containing the control message as a second frame containing a reissued control message and transmitting the second frame containing the reissued control message to the particular downstream node that did not acknowledge receipt of the control message, the reissued control message having the same format as the control message, the second frame having a source MAC address identifying a node that reissued the reissued control message as the source of the reissued control message.

9. The method of claim 8, wherein the control message is a link state routing protocol control message.

10. The method of claim 8, where the control plane specific multicast group address is a source-specific multicast address.

11. The method of claim 8, where the control plane specific multicast group address is a (*,G) multicast address common to all nodes and assigned to control message exchange.

12. The method of claim 8, where a selection of the plurality of downstream nodes to which the frame is forwarded is determined by a shortest path tree rooted on the originator of the message.

13. The method of claim 8, further comprising the step of:
acknowledging the frame, by the second node to the first node, if the frame passes the reverse path forwarding check on the second node.

14. The method of claim 13, wherein the step of acknowledging the frame to the first node is only performed if the second node is two-connected between the first node and a third node, wherein a node is two-connected if it is serially connected between two adjacent nodes.

* * * * *